United States Patent
Kaminski

(10) Patent No.: US 6,341,684 B1
(45) Date of Patent: Jan. 29, 2002

(54) BLOWN PLASTIC CONTAINERS AND METHOD OF HANDLING SAME

(75) Inventor: Ronald S. Kaminski, Bowling Green, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 0 days.

(21) Appl. No.: 09/526,808

(22) Filed: Mar. 16, 2000

(51) Int. Cl.[7] ............................................. B65G 17/32
(52) U.S. Cl. .................................. 198/377.07; 198/802
(58) Field of Search ........................... 198/802, 377.07, 198/803.7, 803.3, 377.02, 617

(56) References Cited

U.S. PATENT DOCUMENTS 3,612,254 A * 10/1971 Wideman .................. 198/802
4,361,531 A * 11/1982 Black ........................ 264/161
4,614,018 A    9/1986 Krall

* cited by examiner

Primary Examiner—Kenneth W. Noland

(57) ABSTRACT

An as molded thermoplastic container (10) having a body portion (12) and a moil (16) extending outwardly from a rim (14) of the container, the moil and the body portion being molded integrally with one another. The moil has an opposed pair of outwardly projecting shoulders (18, 20) by which the container is supported from a spaced apart pair of rails (22, 24) as the container moves along a path of travel (A). The lateral extent of the moil along the path of travel is substantially equal to and aligned with the lateral extent of the body portion along the path of travel, whereby a plurality of like containers will move along the path of travel with the longitudinal central axes of the containers parallel with one another.

6 Claims, 2 Drawing Sheets

BLOWN PLASTIC CONTAINERS AND METHOD OF HANDLING SAME

BACKGROUND OF THE INVENTION

1. Field of the Invention

This invention relates to the construction of a thermoplastic container produced by a blow molding process and to a method of handling a plurality of such containers. More particularly, this invention relates to the configuration of a removable moil portion of such a container that, before removal, facilitates the high speed handling of a multitude of like containers.

2. Description of the Prior Art

Many thermoplastic containers are produced, on a mass production basis, by blow molding on a blow molding machine of the "wheel" type. Such containers, each of which is produced with a removable excess portion known as a "moil" above the rim that surrounds the opening into the container, must be handled at very high speeds, for example, in excess of 200 containers per minute, to permit the molding machine to operate at or near rated capacity. However, present handling techniques involve the handling of such containers on flat top vacuum conveyors, and the handling speeds of handling containers in this manner limit the rate at which containers can be handled to a production rate below that of the types of wheel blow molding machines in widespread use.

It is known that blown containers can be handled more rapidly by an air handling conveying system in which containers are suspended on spaced apart rails at locations well above the bottoms of such containers. However, in attempting to adapt such in an air handling container conveying system to the high speed handling of blown thermoplastic containers, it was found that it was difficult to maintain the containers with their longitudinal central axes parallel to each other, as required for proper handling.

SUMMARY OF THE INVENTION

The aforesaid and other problems associated with the high speed handling of blown thermoplastic containers are addressed by constructing each container, in its as molded condition, with a moil with outwardly projecting shoulders from which the container may be suspended during conveying along a portion of its travel path from a molding machine to a moil removal station, and by constructing each such moil with a lateral extent, along such travel path, such that contact between the moils of adjacent containers in contact with each other will maintain the longitudinal central axes of such containers parallel to each other.

Accordingly, it is an object of the present invention to provide a blown thermoplastic container with a removable moil that facilitates improved high speed handling of the containers after blowing and prior to the removal of the removable moil. It is also an object of the present invention to provide an improved method of handling a plurality of like blown thermoplastic containers in their as molded condition.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
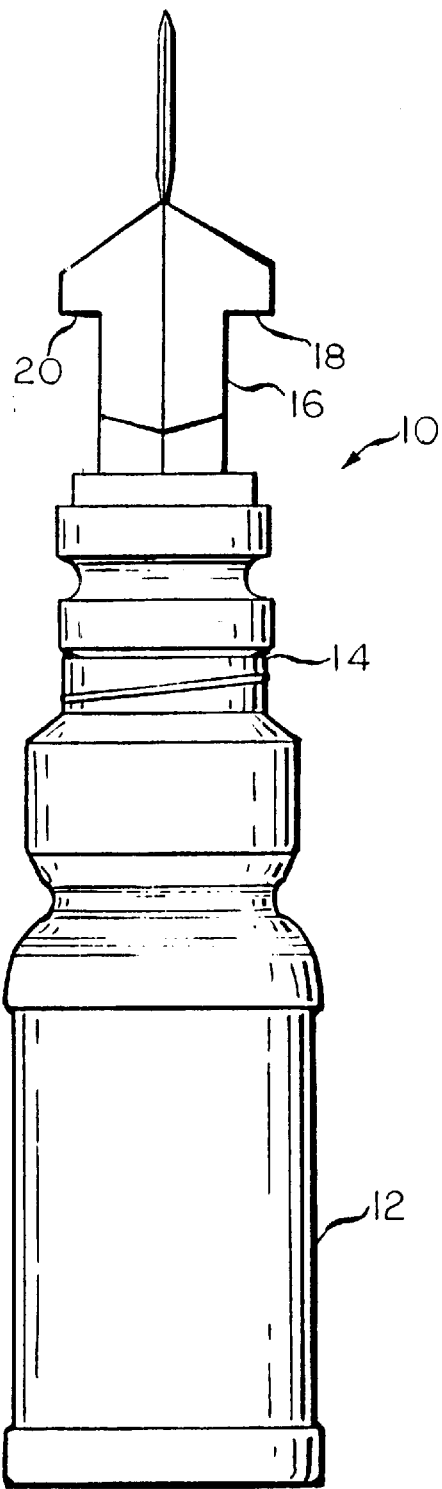
FIG. 1 is a end elevational view of an as molded blown plastic container according to the preferred embodiment of the present invention.
Figure 2:
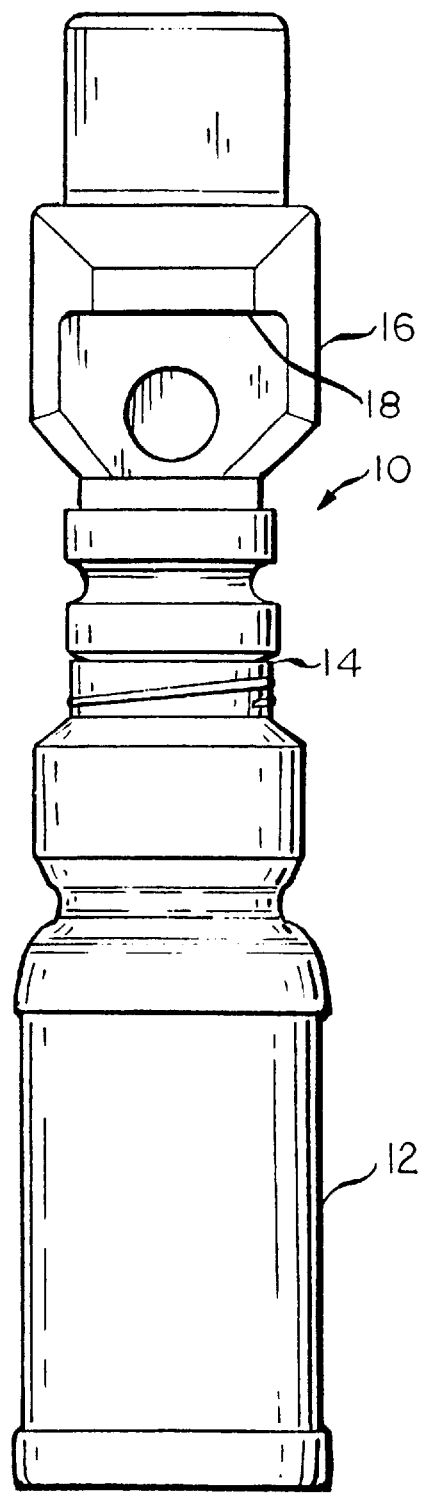
FIG. 2 is a side elevational view of the container of FIG. 1.
Figure 3:
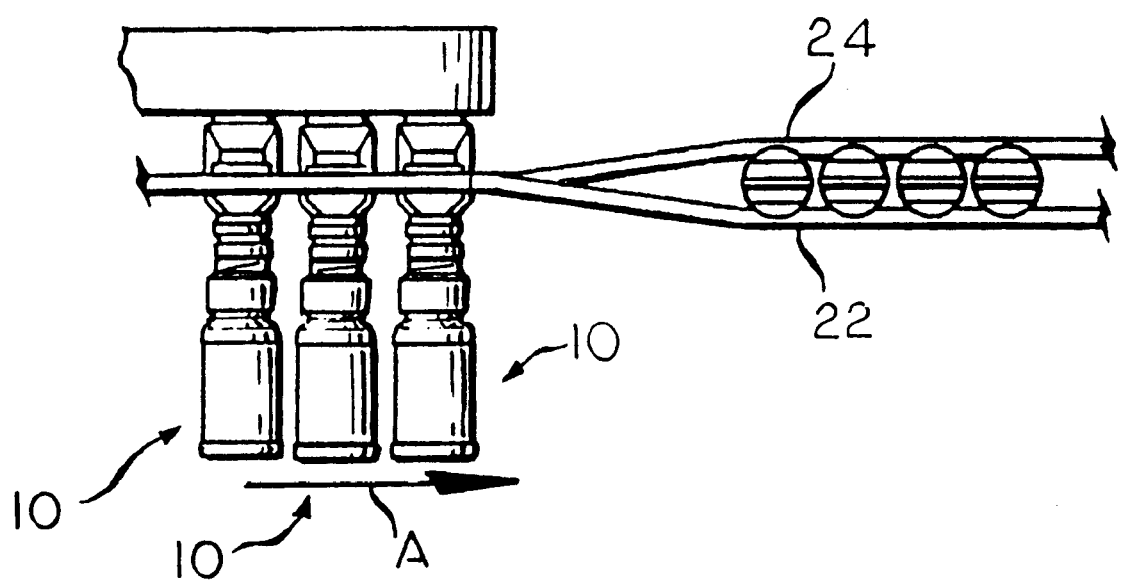
FIG. 3 is an elevational view, at a reduced scale, showing a step in the conveying of a plurality of like containers according to FIGS. 1 and 2.

An as molded blow molded thermoplastic container according to the preferred embodiment of the present invention is identified generally by reference numeral 10 in the drawing. The container 10 is blown from a suitable thermoplastic material, such as high density polyethylene or polypropylene, and is preferably blown by a blow molding machine of the wheel type, a machine in which a plurality of pairs of blown containers are produced with each pair of containers positioned end to end and in which the plurality of pairs of containers exit the machine, in sequence, with their longitudinal central axes extending horizontally and parallel to each other. The container 10, which is shown after uprighting and after severing from its like twin, has a body portion 12 that terminates in a rim 14, which surrounds an open mouth of the container 10; the container 10, as molded, also has a moil 16 that extends beyond the rim 14 and is molded integrally with the body portion 12.

The moil 16 has an opposed pair of outwardly extending shoulders 18, 20, by which the molded container 10, after inverting and severing from its like twin, may be supported on spaced apart rails 22, 24, as a plurality of like containers 10 are conveyed along a path of travel that is indicated by the arrow A. In the case of a container 10 with a generally cylindrical body portion 12, the moil 16 extends, along the path of travel A, equidistantly from a longitudinal central axis of the container 10 and at a distance equal to the maximum radius of the body portion 12. Thus, containers 10, when in contact with one another along the path of travel A, will have their longitudinal central axes maintained parallel to one another by contact between a moil 16 of a given container 10 and a moil 16 of an adjacent like container 10. Conveying of the containers 10 in that manner, when supported by the rails 22, 24, can be done very rapidly by an overhead air handling conveying system and with the assurance that the containers 10 will remain at all times with their longitudinal central axes parallel to one another. Of course, eventually the moils 16 will be severed from the containers 10, so that the rim 14 of each container 10 will be the uppermost extent of such container 10.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. An as molded, blow molded thermoplastic container comprising:
    a body portion having a rim, said body portion having a lateral extent along a path of travel of a plurality of like containers;
    a moil formed integrally with said body portion and severable from said body portion at said rim, said moil having an opposed pair of outwardly extending shoulders by which said container can be supported by a spaced apart pair of rails as said container moves along the path of travel, said moil further having a lateral extent, along the path of travel, that is substantially equal to and aligned with the lateral extent of the body portion, whereby adjacent containers in a series of like containers will remain substantially parallel to one another as the like containers move along the path of travel.

2. A container according to claim 1 wherein the container is blow molded from a thermoplastic material having a primary ingredient selected from the group consisting of high density polyethylene and polypropylene.

3. A container according to claim 2 wherein the body portion of the container is generally cylindrical in configuration with a longitudinal central axis, and wherein the lateral extent of the moil, in each of an opposed pair of directions along the path of travel, is substantially equal to a maximum radius of the body portion of the container.

4. The method of conveying a plurality of like, as molded thermoplastic containers along a path of travel, each container having a body portion with a rim and a lateral extent along the path of travel, and a moil formed integrally with the body portion and severable from the body portion at the rim, the method comprising:

providing the moil with an opposed pair of outwardly projecting shoulders; and providing a spaced apart pair of rails extending along the path of travel, each container being supported as it moves along the path of travel by engagement of the shoulders of the moil with the rails.

5. The method according to claim 4 wherein the body portion has a lateral extent along the path of travel, and wherein the moil has a lateral extent along the path of travel that is substantially equal to and aligned with the lateral extent of the body portion whereby adjacent containers in the plurality of like containers will remain substantially parallel to one another as the plurality of like containers move along the path of travel.

6. The method according to claim 5 wherein the body portion of each of the plurality of like containers is substantially cylindrical in configuration and has a longitudinal central axis, and wherein the moil has a lateral extent in each of a pair of opposed directions, along the path of travel, that is substantially equal to a maximum radius of the body portion of the container.

* * * * *